United States Patent [19]

Schneeberger

[11] Patent Number: 4,971,544
[45] Date of Patent: Nov. 20, 1990

[54] APPARATUS FOR CHARGING A MOLD TO PRODUCE MOLDED PLASTIC PARTS

[75] Inventor: Erich Schneeberger, Oberweningen, Switzerland

[73] Assignee: Bucher-Guyer AG, Niederweningen, Switzerland

[21] Appl. No.: 413,065

[22] Filed: Sep. 27, 1989

Related U.S. Application Data

[63] Continuation of Ser. No. 122,965, Nov. 19, 1987, abandoned.

[30] Foreign Application Priority Data

Nov. 19, 1986 [CH] Switzerland ............... 4628/86-3

[51] Int. Cl.$^5$ .................. B29C 43/34; B29C 47/34
[52] U.S. Cl. ................... 425/528; 198/861.4;
264/210.1; 264/320; 414/470; 414/471;
425/145; 425/166; 425/297; 425/397
[58] Field of Search ............. 425/140, 145, 147, 148,
425/150, 166, 256, 258, 259, 260, 261, 375, 397,
400, 406, 412, 447, 448, 810, 296, 297, 305.1;
264/40.4, 148, 212, 297.5, 320, 322, 210.1;
198/497, 861.4, 952; 414/469–471, 488, 507,
528, 609, 610, 639, 641, 663

[56] References Cited

U.S. PATENT DOCUMENTS

| | | | |
|---|---|---|---|
| 1,760,234 | 5/1930 | Frederick | 425/502 |
| 2,989,774 | 6/1961 | Erickson et al. | 264/297.5 |
| 3,040,381 | 6/1962 | Pioch | 425/447 |
| 3,171,534 | 3/1965 | Oury | 198/497 |
| 3,196,485 | 7/1965 | Battenfeld et al. | 425/589 |
| 3,499,069 | 3/1970 | Seigle | 425/148 |
| 3,822,794 | 7/1974 | Fougea | 425/258 |
| 4,005,965 | 2/1977 | Roczynski et al. | 425/810 |
| 4,038,531 | 7/1977 | Loe, Jr. | 425/148 |
| 4,082,181 | 4/1978 | Berthold et al. | 198/861.4 |
| 4,249,876 | 2/1981 | Strausfeld et al. | 425/810 |
| 4,360,331 | 11/1982 | Hiraoka | 425/148 |
| 4,432,716 | 2/1984 | Kiss | 425/383 |
| 4,459,093 | 7/1984 | Asano | 425/297 |
| 4,571,320 | 2/1986 | Walker | 425/397 |
| 4,579,514 | 4/1986 | Repella | 425/397 |
| 4,580,964 | 4/1986 | Repella | 425/397 |

FOREIGN PATENT DOCUMENTS

| | | | |
|---|---|---|---|
| 268199 | 5/1988 | European Pat. Off. | 425/258 |
| 2552157 | 5/1977 | Fed. Rep. of Germany | 425/258 |
| 2504446 | 10/1982 | France | 425/258 |

Primary Examiner—James C. Housel
Attorney, Agent, or Firm—Edmund M. Jaskiewicz

[57] ABSTRACT

An apparatus for charging an open mold with a plasticized material to produce molded plastic parts has a movable endless belt to define a surface upon which is received a plurality of masses of plastic material in a predetermined arrangement after the material has been plasticized. Each mass has a predetermined shape approximating the capacity of a mold cavity into which the mass is to be fed. The endless belt has a charge station position in which plasticized material is discharge onto the belt and the entire belt can be fed from the charge station position into such a position with respect to an open mold cavity that a mass of plastic material is fed from the belt surface into the mold cavity.

6 Claims, 1 Drawing Sheet

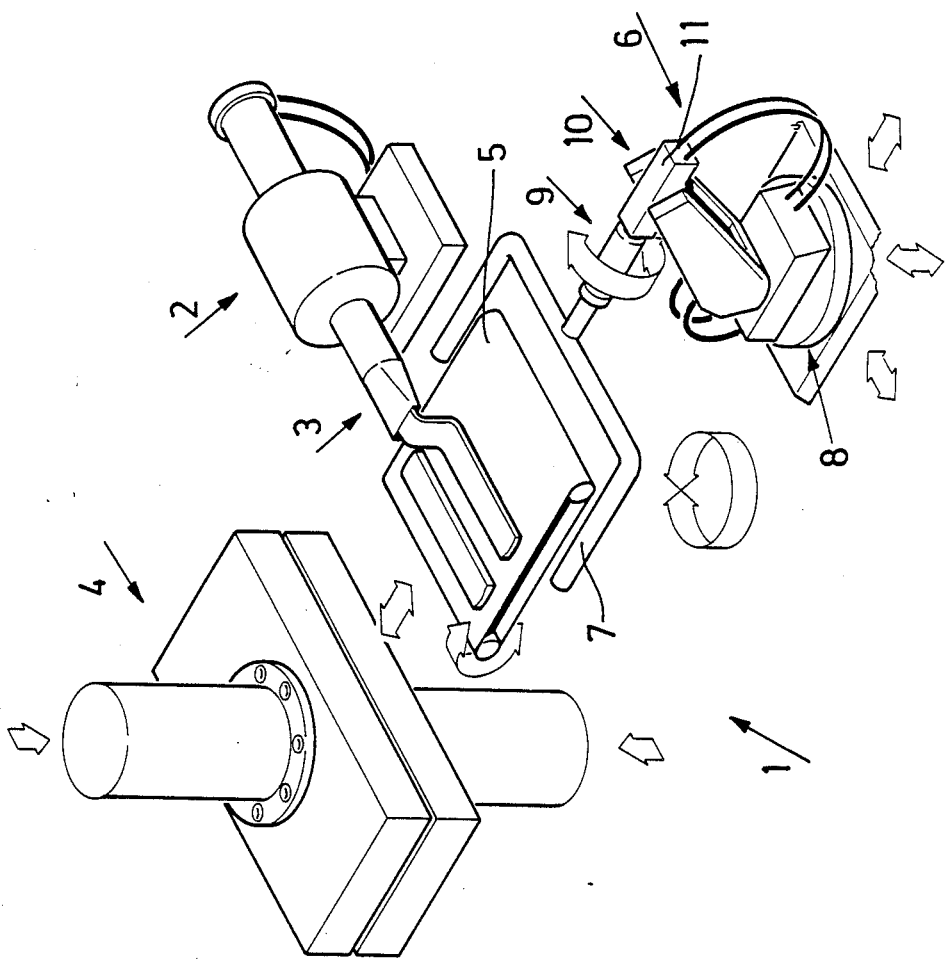

APPARATUS FOR CHARGING A MOLD TO PRODUCE MOLDED PLASTIC PARTS

This is a continuation of application Ser. No. 122,965 filed Nov. 19, 1987, abandoned.

The present invention relates to the production of molded plastic parts in which the plastic, after plasticizing, is fed into an open mold cavity of a mold and molded, more particularly, to the apparatus and process for charging of the open mold cavity.

In the production of plastic parts having large surface areas difficulties are encountered in introducing the plastic material into the mold in such a manner that the resultant molded part has a tension-free and tension-balanced characteristic throughout. When plastic material is sprayed directed into a closed mold the resultant molded parts frequently have objectionable surface formations since the spreading of the plastic material within the mold occurs over such a long period of time that stresses are set up in the plastic material during the molding process. In order to enable the mass of plastic to flow along the walls of a hollow mold in order to fill the mold it is sometimes necessary to use considerable pressure to force the plastic into the mold and this in turn results in objectionable surface formations of the molded part.

In U.S. Pat. No. 3,196,485 there is disclosed a plastic molding device in which the amount of plasticized plastic material intended for the molded part is injected through a central feed channel into a mold cavity which has been widened by retracting opposite walls of the cavity and, subsequently, the cavity is closed and the part molded. This structure is not particularly suitable for large molded parts since the distribution of the plastic into the mold cavity through the feed channel can at best be achieved only with very expensive and complicated equipment and, further, it is difficult to achieve proper strength characteristics of the resulting molded product.

In another known process, a polyester resin molding compound that enhances the strength characteristics is positioned in an open mold cavity in different directions by movable injection units and subsequently molded. However, this process requires considerable expense to provide the necessary controllable drive structure for the injection unit.

It is therefore the principal object of the present invention to provide a novel and improved process and apparatus for the charging of a mold for the production of large surface area molded parts.

It is another object of the present invention to provide such a process and apparatus which assures the production of large-surface molded parts having more precise and uniform strength characteristics and avoiding objectionable surface formations in the molded part.

It is an additional object of the present invention to provide such a process and apparatus which can be economically carried out and can be universally adapted to a wide variety of molded plastic parts.

The objects of the present invention are achieved and the disadvantages of the prior art are overcome by the present invention wherein the plastic which is to be used in a subsequent molding operation is first laid out on a surface in a predetermined pattern or shape and these patterns or shapes of plastic material are subsequently fed into the open mold cavity of a mold.

An apparatus which may be provided in accordance with the present invention for charging an open mold with a plasticized material to produce molded plastic parts may comprise a surface upon which is received a predetermined mass of plastic material after it has been plasticized. The surface is at a charge station position in which position the plastic material is applied to the surface. Subsequently, the surface is fed into such a position with respect to an open mold cavity of a mold that the mass of plastic material on the surface is fed from the surface into the open mold cavity.

A process according to the present invention may comprise the steps of discharging a predetermined mass of plasticized plastic material onto a surface into a predetermined shape and then feeding the mass of shaped plastic material from the surface into an open mold cavity of a mold.

As a result of the present invention the feeding or insertion of the plastic material into the open mold cavity is simplified and the conditions for achieving high strength and reliability of the molded part are significantly improved. The layout of the plastic material on the surface can be precisely controlled using a predetermined layout sequence in which predetermined quantities of plastic material are discharged in predetermined shapes or arrangements on a surface.

An apparatus suitable for carrying out the process is a surface that can be driven and is constructed to be attached and detached from the mold cavity so that the plastic can be fed to the mold cavity after make-up without additional manual support. Of course, the movement of the surface extends at least approximately from a charge station over the mold cavity or cavities.

According to a preferred mode of operation, the surface can be constructed to be movable horizontally or, in the situation of self-locking, in an inclined position obtainable between the material and the surface, whereby the regularity of the laid out plastic can be promoted.

In a special way of laying out the plastic it is advantageous if the surface can swing around a horizontal axis or an axis that can be shifted in an inclined position obtainable in the self-locking situation.

The ability of the surface to revolve around a vertical axis, whereby an unlimited layout of the plastic on the surface becomes possible, is also advantageous.

Preferably the surface is a belt, whereby a favorable drive design can be effected.

For this purpose, a preferably endless belt that runs around rollers and proves to be a simple means with low construction expenses is suitable.

A belt that can be unwound from a roller and rewound after use can also be used advantageously.

In charging the mold cavity or cavities in the process according to the invention, the feed or withdrawal speed and the drive speed of the surface provided with the plastic laid out in the predetermined layout arrangement are designed to be at least approximately equal in magnitude.

The mutual dependence of the feed or withdrawal speed on the drive speed of the surface is determined by the established layout arrangement of the plastic on this surface and of the plastic in the mold cavity.

It is entirely possible to carry out the drive of the surface and the feed or withdrawal movements at different speeds, where this difference corresponds proportionally as much as possible to the difference formed between the layout arrangement of the plastic on the surface and that in the mold cavity. Identical layout relationships on the surface and in the mold cavity do not force a change in speed; however, using different speeds, the layout of the discharged plastic in the mold cavity can be changed, i.e., at a higher drive speed of the surface relative to the feed or withdrawal speed, a larger amount of plastic per unit of time can be fed to the mold cavity or, at a lower drive speed of the surface, a lesser amount of the plastic can be fed. As already mentioned, the plastic spread out on the surface in one or more parts can be suitably fed to the mold cavity with the feed and withdrawal movement.

To avoid an undesired adhesion of the plastic, especially of thermoset plastics, to the surface or the belt, the latter is preferably cooled, which promotes the retardation of setting.

Alternatively, a stripping device extending perpendicular to the direction of movement can be provided to counter the adhesion of the plastic to the surface of the belt.

To control the amount of plastic to be fed, the surface can be provided with a scale or be connected to one.

Further objects and advantages of the present invention will be apparent upon reference to the accompanying description and drawing, which is exemplary, wherein the single FIGURE of the drawing shows a perspective view of a charging apparatus positioned between the plasticizing device of a plastic processing machine and a mold according to the present invention.

The drawing shows a charge device 1 of a plastics processing machine embodied in the scope of the invention concept. The plastic, for example polyester resin enriched with fillers and/or reinforcement fibers, which flows flat out of plasticizing unit 2 through a slot die 3, is laid out before molding in a molding press indicated by 4 on a surface designed as a continuous belt 5. The adjustment of the position of this belt 5 that runs around rollers occurs by a robot-like drive unit 6 that is connected to a control unit (not shown). A fork-like holder 7 links belt 5 and drive unit 6, which can be moved and fixed in vertical and horizontal directions. With a turning drive 8, belt 5 is designed to be swingable and it can also, with other drives 9, 10 operating on holder 7, be tilted in all directions. The feed and withdrawal movement occurs by a cylinder 11 that can be operated hydraulically or pneumatically. Drive unit 6 could also be placed under drivable belt 5 or the drivable surface; a possibility which is known in the art.

After or while the certain amount or mass of plastic has been or is being laid out on belt 5 or surface, the charging of the open mold can occur. In doing so, time-consuming paths are to be avoided by matching the surface or belt 5 to the circumstances prevailing at the time. The amount required for charging a mold cavity can, for example, be laid out on the belt 5 that extends to the mold and subsequently fed with the aid of the feed movement and the belt movement of identical speed. It proves to be especially efficient if the charging of the mold cavity occurs during the laying out of the plastic on the drivable surface.

The plastic is discharged flat through a die slot 3, which is especially suited for this purpose and, according to the previously described layout arrangement, is laid out on the correspondingly controlled surface.

Thus it can be seen that the present invention has disclosed an apparatus and process for the charging of an open mold cavity which is particularly suited for the molding of large surface area parts. The quantity of plastic material which is to be molded is first positioned upon a surface in a shape approximating the capacity of the mold cavity and this shape of plastic material is then fed into the mold cavity. The result is a molded part without undesirable internal stresses and objectionable surface formations.

It will be understood that this invention is susceptible to modification in order to adapt it to different usages and conditions, and accordingly, it is desired to comprehend such modifications within this invention as may fall within the scope of the appended claims.

What is claimed is:

1. An apparatus for charging an open mold with a plasticized material to produce molded plastic parts, comprising a molding press having a mold cavity therein shaped for the molding of large surface area parts, a plasticizing unit having a discharge slot die, said slot die being disposed substantially horizontally so that plasticized material is discharged in a flat mass approximating the shape of the mold cavity into which the plasticized material is to be fed, means for charging said mold cavity with said plasticized material comprising a continuous belt having a horizontally movable surface disposed beneath said slot die so as to receive the discharged flat mass of plasticized material and extending toward said mold cavity, means for driving said movable surface such that different portions of said movable surface can each receive a flat mass of plasticized material, and means attached to said charging means for feeding said continuous belt to a position above said mold cavity and within said press, and withdrawing said continuous belt from said mold cavity.

2. In an apparatus as claimed in claim 1 and comprising means for pivoting said continuous belt about a substantially horizontal axis.

3. In an apparatus as claimed in claim 1 and comprising means for pivoting said continuous belt about a vertical axis.

4. An apparatus as claimed in claim 1 wherein the drive speed of said continuous belt and the speeds of feeding and withdrawing said continuous belt to and from said mold cavity are independently variable and can be controlled as a function of the deviation between the arrangement of plastic masses on the surface means and the arrangement of the plastic masses in the mold cavity.

5. An apparatus as claimed in claim 1 wherein said slot die is disposed laterally of said horizontal movable surface.

6. An apparatus as claimed in claim 1 and further comprising means for displacing said horizontal movable surface transversely relative to said slot die during discharge of said plasticized material thereon such that the discharged flat mass of plasticized material is disposed transversely on said movable surface.

* * * * *